2,748,521

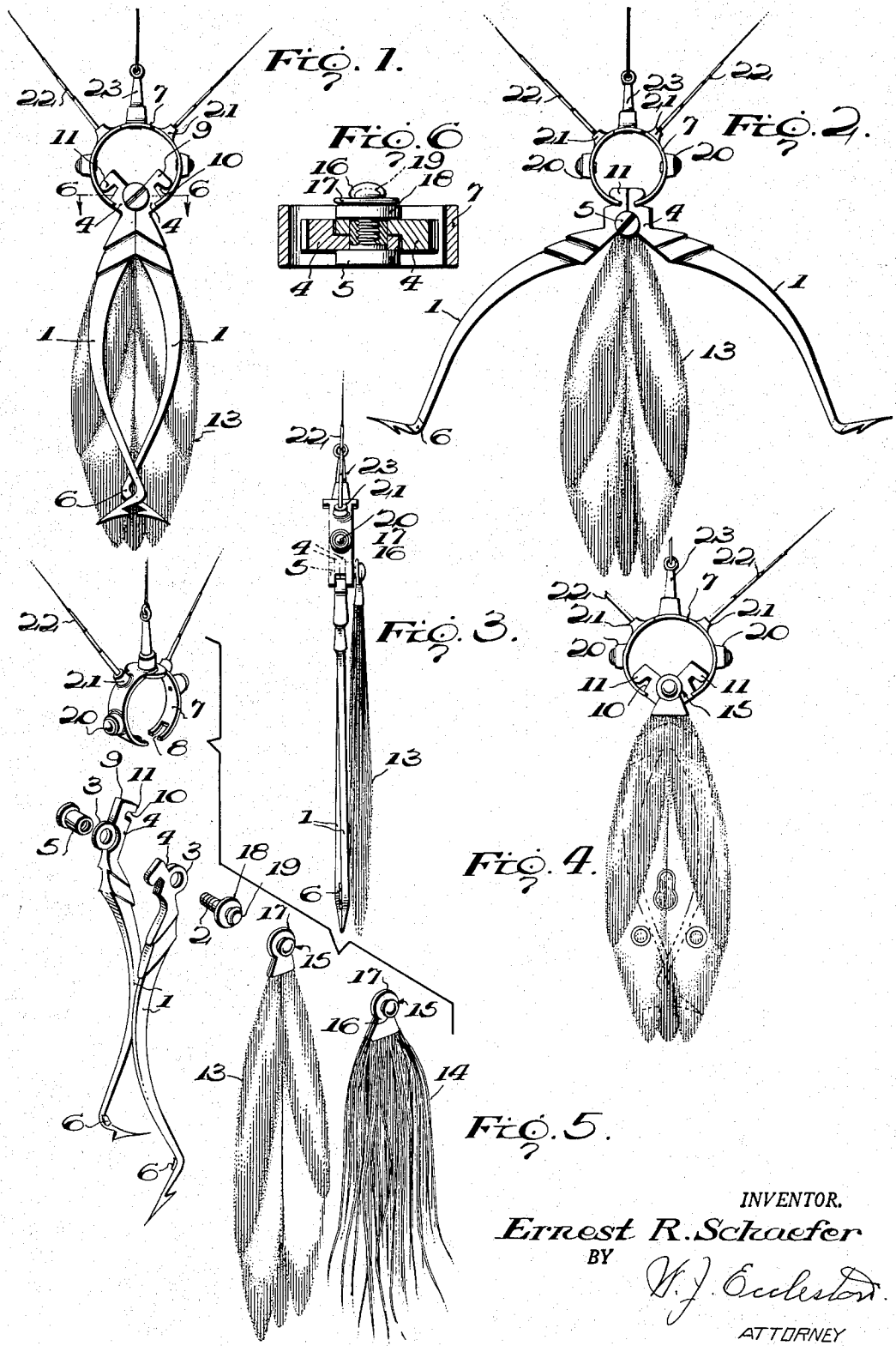

INTERCHANGEABLE, COMBINATION LURE AND HOOKS

Ernest R. Schaefer, Silver Spring, Md.

Application February 23, 1954, Serial No. 412,141

3 Claims. (Cl. 43—35)

(Granted under Title 35, U. S. Code (1952), sec. 266)

The invention described herein, if patented, may be manufactured and used by or for the Government for governmental purposes, without the payment to me of any royalty thereon.

This invention relates to fish lures and hooks, and has for its primary object to provide a simplified construction of spring-operated hooks.

A further object of the invention resides in providing a fish lure of this type in which the means for projecting the hooks is a leaf spring of substantially circular shape and adapted to form a foundation of base for eyes, feelers, etc., in simulation of various baits for attracting fish.

Another object of the invention consists in the provision of novel means for detachably mounting bunches of hairs, feathers or the like on the lure so that its general appearance may readily be changed from time to time, as desired.

Other objects and advantages of the invention will be apparent from the following description when taken in connection with the accompanying drawings, in which, Figure 1 is a plan view of the improved lure with the hooks in retracted position ready for use;

Figure 2 is a similar view showing the hooks released and in the position they would assume if they fail to contact the fish;

Figure 3 is an edge view of the device in the position shown in Figure 1;

Figure 4 is a view similar to Figure 1 showing the obverse side of the lure;

Figure 5 is an exploded perspective view showing the various parts of the lure; and Figure 6 is an enlarged horizontal sectional view taken on the line 6—6 of Figure 1 and looking in the direction of the arrows.

The lure of this invention is of the type in which two or more hooks or gaffs are pivoted together and normally retained in retracted position but forcibly moved to snare a fish or the like if the retaining means for the hooks are rendered ineffective by action of a fish. In the present instance the hooks or gaffs are indicated by the reference numeral 1 and are pivotally connected through the medium of a threaded pin 2 which is adapted to extend through eyes 3 formed in the base 4 of the hooks. The pin 2 is secured in position by means of a sleeve type nut 5 as indicated in Figure 5. These hooks 1—1 are normally retained in inoperative position, against the spring to be later described, by interlocking means indicated by the numeral 6 which may be provided on one or both of the hooks so that when the hooks are brought into overlapping position, as shown in Figures 1 and 4, they will be retained until such time as they are contacted by a fish or other object which will impart sufficient lateral movements to the hooks or one of the hooks to disengage the interlocking means.

The means for imparting a quick movement to the hooks or gaffs 1 to impale a fish consists of a leaf spring 7, here shown as of substantially circular formation and having its opposed ends notched as indicated by the numeral 8, for engagement over the base portion 4 of the hooks when the latter are in retracted position. The base portions are formed with extensions 9, and these extensions are provided with outwardly directed notches 10 thereby providing hook portions 11 which serve to limit the movement of the ends of the spring when they move toward each other to project the hooks or gaffs 1 into operative position when the interlocking means 6 is released.

For the purpose of concealing the hooks 1 and to give the lure the appearance of a bug or the like a bunch of feathers or the like 13 is connected to the lure, and in order that this simulating means may be changed as desired as, for instance, for a bunch of hairs 14 as shown at the right of Figure 5, a snap element 15 is provided. This element comprises a female portion 16 flanged as at 17 (Figure 6). On the pin 2, which is provided with a head 18, is the male member 19 of the snap fastener and over which the member 15 is snapped as clearly indicated in Figure 6.

In further simulation of a bug or other type of insect which might be attractive to a fish, elements 20 are mounted, in any preferred manner, on the sides of the spring 7 as representing the eyes of an insect, and socket members 21 are mounted on the forward portion of the spring for the reception of flexible elements 22 in simulation of the feelers or antenna of a bug. On the forward portion of the spring, i. e., the portion diametrically opposed to the ends of the spring, an eye member 23 is mounted for the reception of the usual fishline.

From the foregoing description taken in connection with the accompanying drawings it will be apparent to those skilled in the art that I have devised an exceedingly simple construction of fish lure of the expanding hook or gaff type in which an arcuate spring is employed for forcibly projecting the hooks when they are released by action of a fish, that such spring is so designed as to form a base or foundation for various attachments in simulation of the features of a bug or the like which might be attractive to fish, that a bunch of feathers or hairs are attached to the pivot of the hooks for the purpose of concealing the latter and in simulation of the body of the bug, and that such element is detachably mounted by means of snap fasteners so that one form may be readily substituted for another when desired.

In accordance with the patent statutes, I have described what I now consider to be the preferred form of the invention but inasmuch as minor changes may be made in the structural details without departing from the spirit of the invention, it is intended that all such changes be included within the scope of the appended claims.

I claim:

1. A fish lure comprising a pair of hooks, a pivot pin on which said hooks are pivotally mounted, a rounded head on one end of the pin, a bunch of hairs or the like, and a socket member on said hairs snapped onto said head.

2. A fish lure comprising a pair of hooks, a pivot pin on which said hooks are pivotally mounted, a rounded head on one end of the pin, a bunch of hairs or the like, a socket member on said hairs snapped onto said head, interlocking means on the hooks for normally holding them in retracted position when in use, and spring means for swinging said hooks about their pivot when the interlocking means become disengaged.

3. A fish lure comprising a pair of hooks provided with hinge eyes, a threaded pin extended through said eyes and forming a pivot for the hooks, a nut threaded on said pin, interlocking means on the hooks for normally holding them in retracted position when in use, spring means for swinging said hooks about their pivot when the interlocking means become disengaged, a rounded head formed on said pin, a detachable socket member for said head, and a bunch of hairs or the like connected to said socket member.

References Cited in the file of this patent

UNITED STATES PATENTS

| | | |
|---|---|---|
| 456,776 | Prior | July 28, 1891 |
| 484,678 | Shults | Oct. 18, 1892 |
| 614,424 | Evans | Nov. 15, 1898 |
| 683,146 | Robertson | Sept. 24, 1901 |
| 740,775 | Pardon | Oct. 6, 1903 |
| 814,624 | Robinson | Mar. 6, 1906 |
| 922,879 | Gabrielson | May 25, 1909 |
| 1,685,061 | Carr | Sept. 18, 1928 |
| 1,898,442 | Grutsch | Feb. 21, 1933 |
| 2,004,316 | Foote | June 11, 1935 |
| 2,228,591 | Brown | Jan. 14, 1941 |
| 2,519,338 | Arnold | Aug. 22, 1950 |
| 2,611,206 | Harvey | Sept. 23, 1952 |